United States Patent [19]
Menard et al.

[11] Patent Number: 5,951,641
[45] Date of Patent: Sep. 14, 1999

[54] METHOD FOR ACCESSING DATA RECEIVED FROM A SERVER, AND TERMINAL USING SAME

[75] Inventors: Arnaud Menard, Paris; Olivier Spinelli, Houilles, both of France

[73] Assignee: Questel, Paris, France

[21] Appl. No.: 08/875,998

[22] PCT Filed: Feb. 15, 1995

[86] PCT No.: PCT/FR95/00177

§ 371 Date: Oct. 20, 1997

§ 102(e) Date: Oct. 20, 1997

[87] PCT Pub. No.: WO96/25714

PCT Pub. Date: Aug. 22, 1996

[51] Int. Cl.[6] .................... G06F 13/38; G06F 15/17; G06F 17/30; G06F 3/033

[52] U.S. Cl. .................... 709/217; 709/203; 707/4; 345/357

[58] Field of Search .................... 709/217, 203, 709/201; 701/4; 345/357, 353, 345

[56] References Cited

U.S. PATENT DOCUMENTS

| | | |
|---|---|---|
| 5,353,398 | 10/1994 | Kitahara et al. . |
| 5,546,529 | 8/1996 | Bowers et al. .................... 345/357 |
| 5,727,155 | 3/1998 | Dawson .................... 709/217 |
| 5,787,234 | 7/1998 | Molloy . |
| 5,801,696 | 9/1998 | Roberts . |

FOREIGN PATENT DOCUMENTS

| | | |
|---|---|---|
| 0523700 | 1/1993 | European Pat. Off. . |
| 0536077 | 4/1993 | European Pat. Off. . |
| 0627691 | 12/1994 | European Pat. Off. . |

OTHER PUBLICATIONS

Hayne et al.;"Group Data Base Design: Addressing the View Modeling Problem"; Journal of Systems and Software; vol. 28, Iss. 2, pp. 97–116, Feb. 1995.

*Primary Examiner*—Mark H. Rinehart
*Attorney, Agent, or Firm*—Greer, Burns & Crain, Ltd.

[57] ABSTRACT

A method for accessing data received from at least one server (S1, SN) in response to requests (R1–R4, RN) transmitted thereto from a terminal (T), wherein data interchanges between the server (S1, SN) and the terminal (T) are cumulatively collected and stored. The method further includes sensing each prompt message from the server (S1, SN), selectively storing requests (R1–R4, RN) generated in response to each sensed prompt message, displaying a list (La) of stored requests in an access window (FC, FCa–FCe), unfolding (DL1, DL2) in order to select a request (R1, R2) and access data (A1, A2) received in response to said request (R1, R2), and folding (PL1, PL2) in order to select a request (R1, R2) that was previously unfolded (DL1, DL2), and mask the display of the corresponding data (A1, A2) in the access window (FCc, FCd). The method is useful for providing terminal emulators.

17 Claims, 6 Drawing Sheets

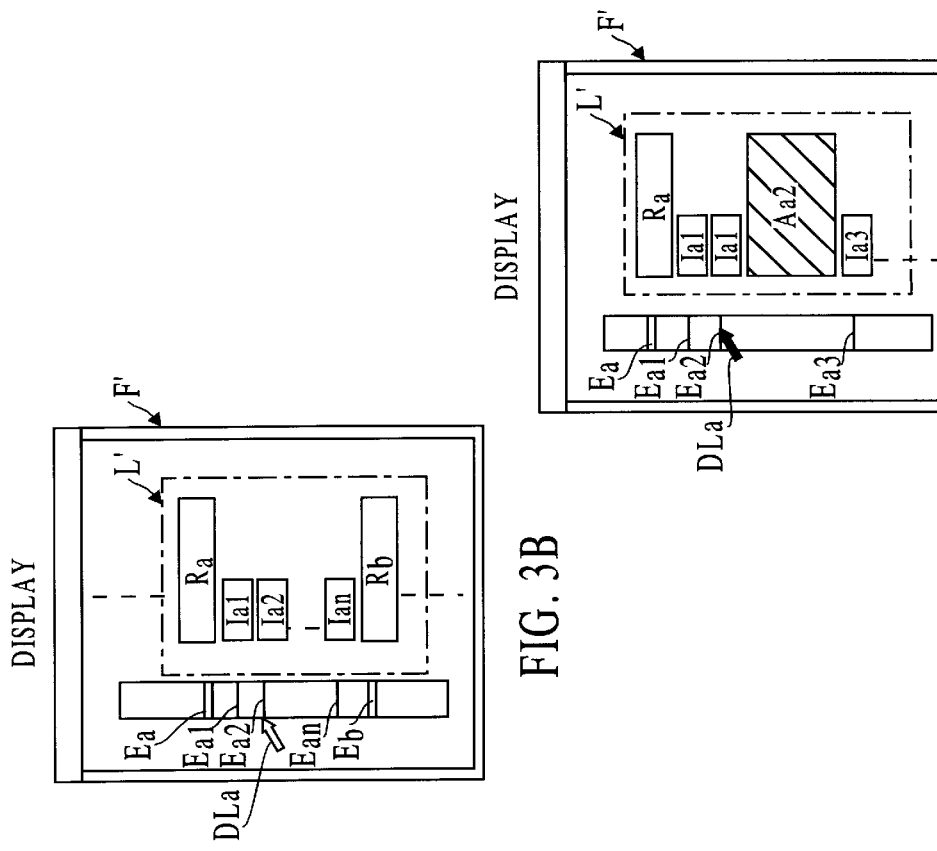
FIG. 3C
FIG. 3B
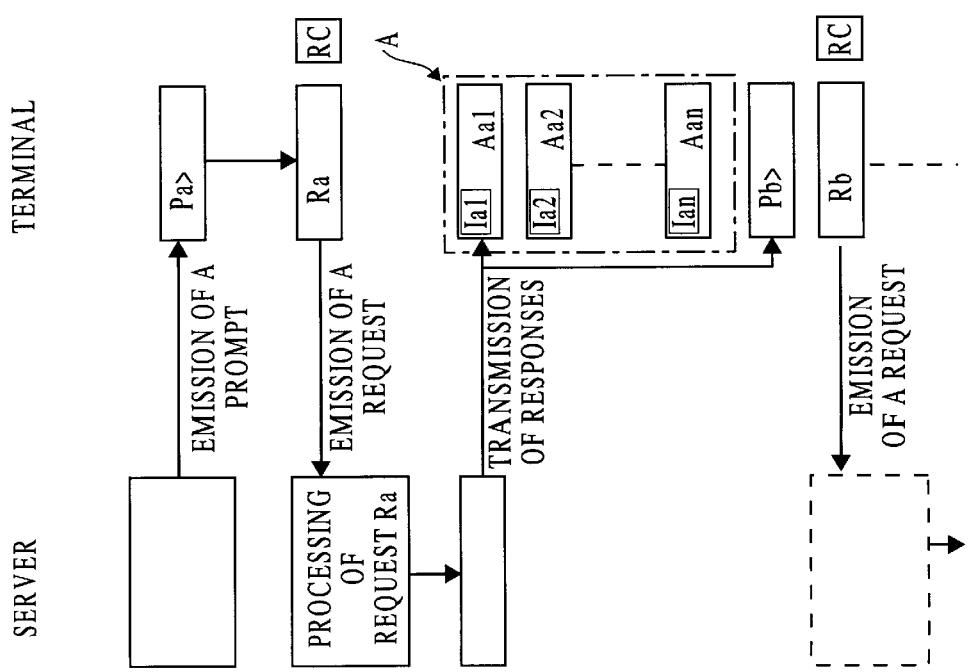
FIG. 3A

METHOD FOR ACCESSING DATA RECEIVED FROM A SERVER, AND TERMINAL USING SAME

DESCRIPTION

The present invention relates to a process for accessing information received from a server. It also relates to a terminal implementing this process.

Consultation of the results of an interrogation session of a database managed by a server may prove lengthy and fastidious on a terminal when, with current consultation processes, it is generally necessary to scroll through a succession of information captured during a session, which is displayed on screen. This information includes unfiltered prompt messages issued by the server, requests submitted by the terminal user, and results or information received in response to these requests. The user must then locate the useful information within all the information, and must himself filter and optionally delete operational messages which are no longer useful.

The purpose of the invention is to overcome these drawbacks by proposing a process for accessing information received from at least one server, in response to requests sent to this server from a terminal, providing a terminal user with a greater facility for selectively accessing received information, thus achieving a saving in time and efficiency in database searches.

According to the invention, the access process including, during each communication session, a stage when information exchanges between the server and the terminal are captured and stored cumulatively, these information exchanges including prompt messages emitted by the server and received by the terminal, requests formulated by a user of said terminal in response to the receipt of a prompt message, information transmitted by the server, in response to a request, is characterized in that it also comprises:

- stages for identifying and selectively storing requests issued from the terminal,
- stages for generating and displaying in a consultation window a list of requests selectively stored during the session,
- stages, called unfolding stages, for selection by the user of a request from within a list of requests with a view to consulting information received in response to this request, each unfolding stage being followed by a stage for reading and displaying in the consultation window the stored information received in response to the said request, this information being displayed within the list of requests following the said request, and
- stages, called folding stages, for selection by the user of a request which has been subject to a prior unfolding stage, with a view to masking the display in the consultation window of the information corresponding to the said selected request.

With the process according to the invention, it thus becomes possible, in the same consultation window, either to display a list or history containing only requests issued from the terminal, or this list with added information in response to one or more requests. In this way, the terminal user is able to "fold" the capture memory, while the list of requests in effect collects the folds of this memory. The user can at will instruct the memory to be unfolded in order to consult a given response to a request. This leads to enhanced legibility of the content of information and messages captured during the session. Response information can also be displayed in new windows opened for that purpose, for example for a FOCUS type command.

There are admittedly already file consultation processes implementing opening and closing stages equivalent to the unfolding and folding implemented in the process according to the invention. Indeed, there are file managers in window-mode operating systems. However, these consultation processes apply to files or documents already constituted and filed within a tree structure.

The merit of the present invention thus resides in the fact that it has combined the features of current file management modes and the specific constraints and characteristics of exchanges between a server and a terminal, with the aim of providing the user with consultation of responses to a request which is easier than with current processes.

In a first operating mode of the process according to the invention, the request identification and selective storage stages comprise:

- stages for detecting and analysing each prompt message originating from the server, and
- stages for selectively storing requests defined by the terminal user in response to each prompt message detected.

This first mode corresponds to the case where prompt messages issued by the server to which the terminal is connected are recognised by this terminal emulator.

If this is not the case, when the terminal is connected to an unknown server or when prompt messages are not recognised, the consultation process according to the invention then operates in a second operating mode in which the identification and selective storage stages include stages for locally identifying each new request entered by the user. This second operating mode corresponds to the emulation of a basic terminal and allows the user to send a request at any time.

In a preferred version of the consultation process according to the invention, a graphical element is associated with each request in the list of requests, and each folding and unfolding stage is activated by pointing to the graphical element associated with the request in question, using the selection means within the terminal.

This provides the user with very easy access to response contents, as in practice he need only click, using a mouse or any equivalent device, on the graphical element associated with the selected request, for example, a bar, a box or any other element, to obtain the information contained in the response to that request.

According to an advantageous provision of the process according to the invention, the folding and unfolding stages can be executed online during the interrogation session, as the list of requests is permanently updated. This combines the advantages of online interrogation in terms of immediate consultation of responses with the ability to rationally organise messages exchanged between the server and the terminal.

Moreover, the consultation process according to the invention can also include folding and unfolding stages executed offline on information captured following an interrogation session.

In the case of the interrogation of a database leading to the issue by the server of a set of responses for the same request, the process according to the invention also comprises, on receipt of the said set of responses, stages for detecting identification elements for each response to the said request, stages for inserting the identification elements thus identified into the list of requests following the said request, unfolding sub-stages for selecting by its identification element a response from the set of responses to the said request with a view to consulting the information contained in that response, this information being inserted into the consultation window following the selected identification element, and folding sub-stages for selecting by its identification element a response which has previously been subjected to an unfolding stage, with a view to masking in the consultation window the display of the information corresponding to the said selected response.

It can also be arranged for the list of requests displayed in the consultation window to also include, for all or part of the requests, additional information relating to the execution of this request. This additional information can in particular include information relating to the transmission conditions of the requests.

The consultation process according to the invention can also be applied to interrogations launched in deferred mode. Thus, for a session carried out by executing a series of requests previously entered and stored offline, this series of requests being displayed within the list of requests in the consultation window, the process according to the invention also comprises, during the online processing of each request by the server, a progressive display of information issued in response to the said request in the consultation window, as they are received by the terminal.

In this implementation of the consultation process according to the invention, the consultation window can also contain at least one availability graphical element indicating whether a following request can be issued.

According to another aspect of the invention, a terminal is proposed, connected via a communications network to at least one server managing a database, implementing the process according to the invention, this terminal including control and processing means to which are associated means of communicating with the network, storage means, input means, selection means, display means and graphical interface means, characterised in that the control and processing means cooperate with the communication means and the graphical interface means to generate and display in a consultation window a list of requests issued from the terminal towards the server, and in that the selection means cooperate with the graphical interface means, the storage means and the control and processing means in order to select a request from the list of requests and display in the consultation window information received in response to the said request and previously captured and stored in the storage means.

In a preferred form of implementation of a terminal according to the convention, the graphical interface means are designed to associate a graphical element with each request within the list of requests, and the selection means cooperate with the control and processing means, the storage means and the graphical interface means to select a request by its associated graphical element and to display the information received in response to this request.

For the implementation of the process according to the invention in the case of a set of responses per request, the control and processing means are designed to detect identification elements for each response to the said request, and cooperate with the graphical interface means to insert the detected identification elements in the list of requests following the said request.

In order to facilitate selection of a response from a set of responses, the selection means cooperate with the control and processing means, the storage means and the graphical interface means in order to select by its identification element a response from the set of responses to the said request with a view to consulting the information contained in that response, this information being inserted in the consultation window following the selected identification element.

Moreover, the selection means cooperate with the control and processing means, the storage means and the graphical interface means in order to select by its identification element a response which has previously been subjected to the unfolding stage, with a view to masking in the consultation window the display of the information corresponding to the said selected response.

The terminal according to the invention can also be designed to be used in deferred mode, the control and processing means, the communication means and the storage means being designed to allow deferred transmission of a series of requests previously input and stored offline. In this case, the graphical interface means and the selection means are designed to inhibit selection of a request by its graphical element with a view to consulting corresponding response information, as long as the control and processing means have not detected and processed reception and storage of this information.

It can also be envisaged that the control and processing means and the graphical interface means cooperate to supply in the processing window a graphical element indicating whether a following request can be issued.

Other particularities and advantages of the invention will be further apparent in the description below. In the annexed drawings given as non-limitative examples:

FIG. 3A is a synoptic view illustrating the stages of the process according to the invention, executed when the information received in response to a request includes several responses;

FIG. 3B shows a second example of a consultation window displaying a list of requests including response identifiers;

FIG. 3C shows the consultation window in FIG. 3B when a response is selected for unfolding;

There follows a description of a preferred form of implementation of a consultation process according to the invention, at the same time as a consultation terminal implementing this process, with reference to the figures indicated above.

Figure 1:
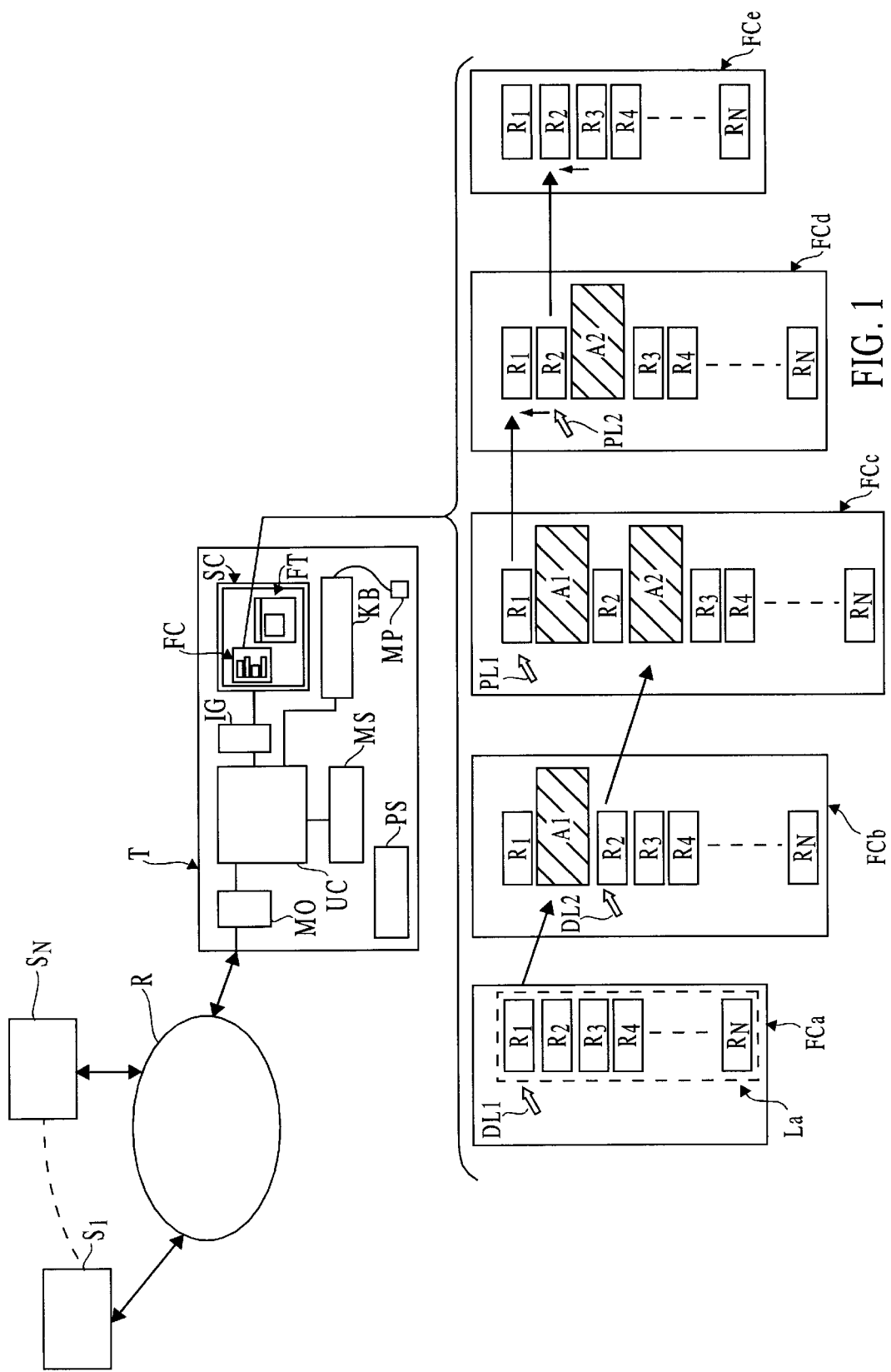
FIG. 1 is a synoptic view illustrating the essential characteristics of the consultation process according to the invention implemented in a terminal communicating with servers via a network.

The consultation process according to the invention is advantageously implemented in a consultation terminal T connected via a communications network R to servers S1, . . . , SN, with reference to FIG. 1. This terminal usually comprises a modulation/demodulation unit MD, a central processing unit UC, a graphical interface unit IG, a screen SC, a keyboard KB, a power supply unit PS, a pointing device MP such as a mouse, and storage means MS. These storage means generally comprise one or more non-volatile storage units, in particular for storing an operating system, a terminal emulation program and utility software, and volatile storage units.

The consultation process according to the invention implements a graphical interface in window mode. The screen SC of the terminal T can thus include consultation windows FC and processing windows FT.

When a terminal user wishes to interrogate a database managed by a server, he undertakes a connection operation to the server during which it supplies an identifier and a password. When the connection between the terminal and the server is established, the user is prompted to formulate a first request by a prompt message issued by the server. This first request, entered using the keyboard KB and terminated by pressing the "enter" key appears in the consultation window FC. After transmission of this request to the server, the server processes it and sends a response to the terminal T. As the characters comprising this response are received, they are displayed in the consultation window if they are pertinent characters, such as document or search information characters. The response associated with a request is thus available as soon as the first characters are received.

These request/response operations are renewed as often as the user deems necessary. On completion of a consultation, whether the terminal is still connected (online) or disconnected from the network (offline), the user can display in the consultation window FCa either a list La of requests R1–R4, RN which he has issued during the session (folded mode), or all requests and responses displayed during the session (unfolded mode), or a combination of requests/responses displayed and requests alone (partially unfolded mode). In folded mode, the list obtained is particularly clear as it is stripped of prompt messages and raw results. The user can then select a request, for example the first request R1, by pointing at it with the pointing means. The process then undertakes a stage called an unfolding stage DL1 at the end of which the information A1 in response to this request appears. The consultation window then displays a new content FCb in which the response A1 is inserted after the corresponding request. This response can then be processed like any other document. If the user repeats the unfolding operation in order to consult the result of the request R2 (DL2 stage), the response A2 to that request is displayed in the consultation window FCc. The user can also instruct the information contained in the consultation window to be "refolded" by selecting a request which is currently "unfolded", for example the request R1. The folding stage PL1 leads to the response A1 disappearing from the consultation window FCd. If the operation is repeated using a folding command PL2, the initial form of the list of requests is redisplayed in the consultation window FCe.

Figure 2A:
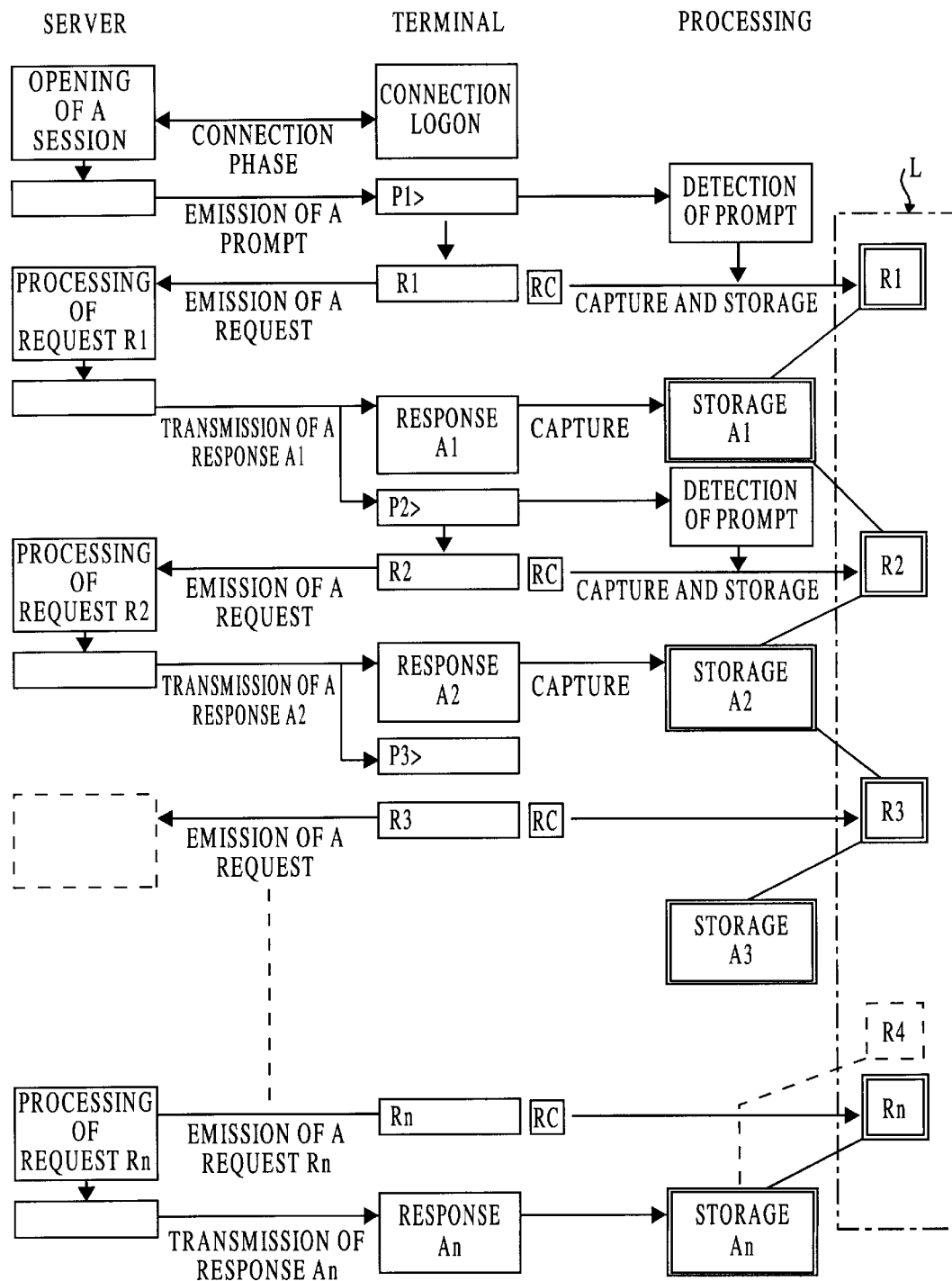
FIG. 2A is a synoptic view illustrating the essential stages of an interrogation session during which the process according to the invention is implemented.
Figure 2B:
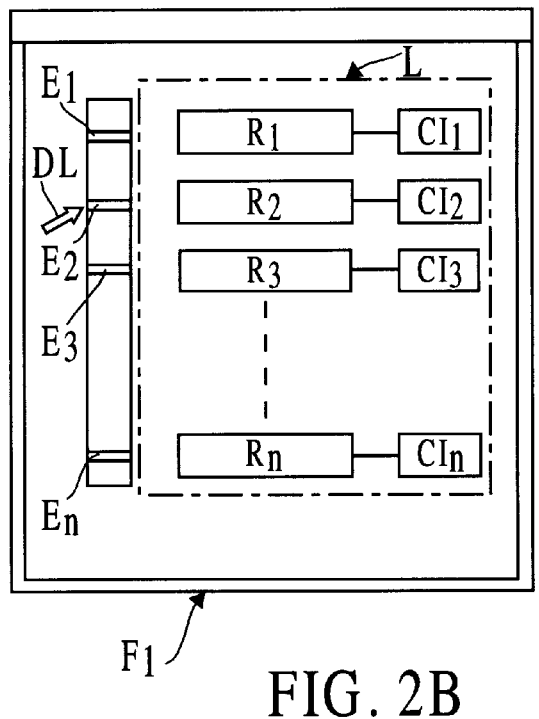
FIG. 2B represents a first example of a consultation window displaying a list of requests, with reference to the synoptic view in FIG. 2A.
Figure 2C:
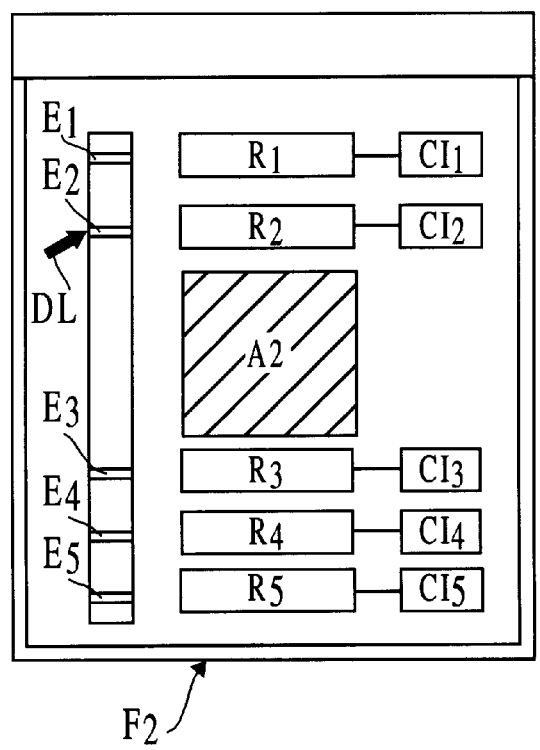
FIG. 2C shows a new status of the consultation window shown in FIG. 2B, when a request is selected for unfolding.

There follows a more detailed description of the transactions between the server and the terminal in the context of the process according to the invention, and of the processing and display stages, with reference to FIGS. 2A, 2B and 2C.

After the connection phase and the opening of a session, the server issues a prompt message P1. The user then issues a request R1, which is processed by the server. This then transmits a response A1, which is captured and stored on the terminal's storage means. The transmission of the response A1 is immediately followed by a new prompt message P2. These operations are repeated until a set of requests R1–R3, Rn is obtained, with which responses A1–A3, An are associated. The consultation process provides the user with a list L of these requests in a consultation window F1. With each request R1–R3, Rn is associated a graphical element E1–E3, En, for example a bar, a box or any other sign or symbol, and optionally an additional information item CI1–CI3, CIn relating for example to the nature of the responses or to the communications conditions. When the user points (DL) to the graphical element E2 associated with a request R2, the response A2 to that request then appears in the consultation window F2.

On consultation of a database which can issue several responses to a single request, for example a patent base, the consultation process according to the invention gives the user the possibility of easily locating a response among a set of responses. Thus, with reference to FIG. 3A, when a server transmits a set A constituted by several responses A$a$1, A$a$2, . . . , A$a$n in response to a request R$a$ issued following a prompt message P$a$, the process according to the invention can be configured to process these different responses, for example by detecting identifiers I$a$1, I$a$2, . . . , I$a$n at the beginning of each response. The user then displays in a consultation window F' a list L' containing not only the requests R$a$, R$b$ issued during the session, but also the titles or identifiers (for example, 1/5, 2/5, 3/5, 4/5, 5/5) of multiple responses to several requests, with reference to FIG. 3B. The user can then consult at leisure the different responses by pointing at and selecting them (DL$a$ stage), for example using the associated graphical element E$a$2, the desired response identifier I$a$2, with a view to consulting the response content A$a$2, with reference to FIG. 3C.

It should be noted that the subdivision of a response to a request into a set of responses which can be individually processed and displayed can be applied on several levels, until elementary documents are obtained and processed.

Figure 4A:
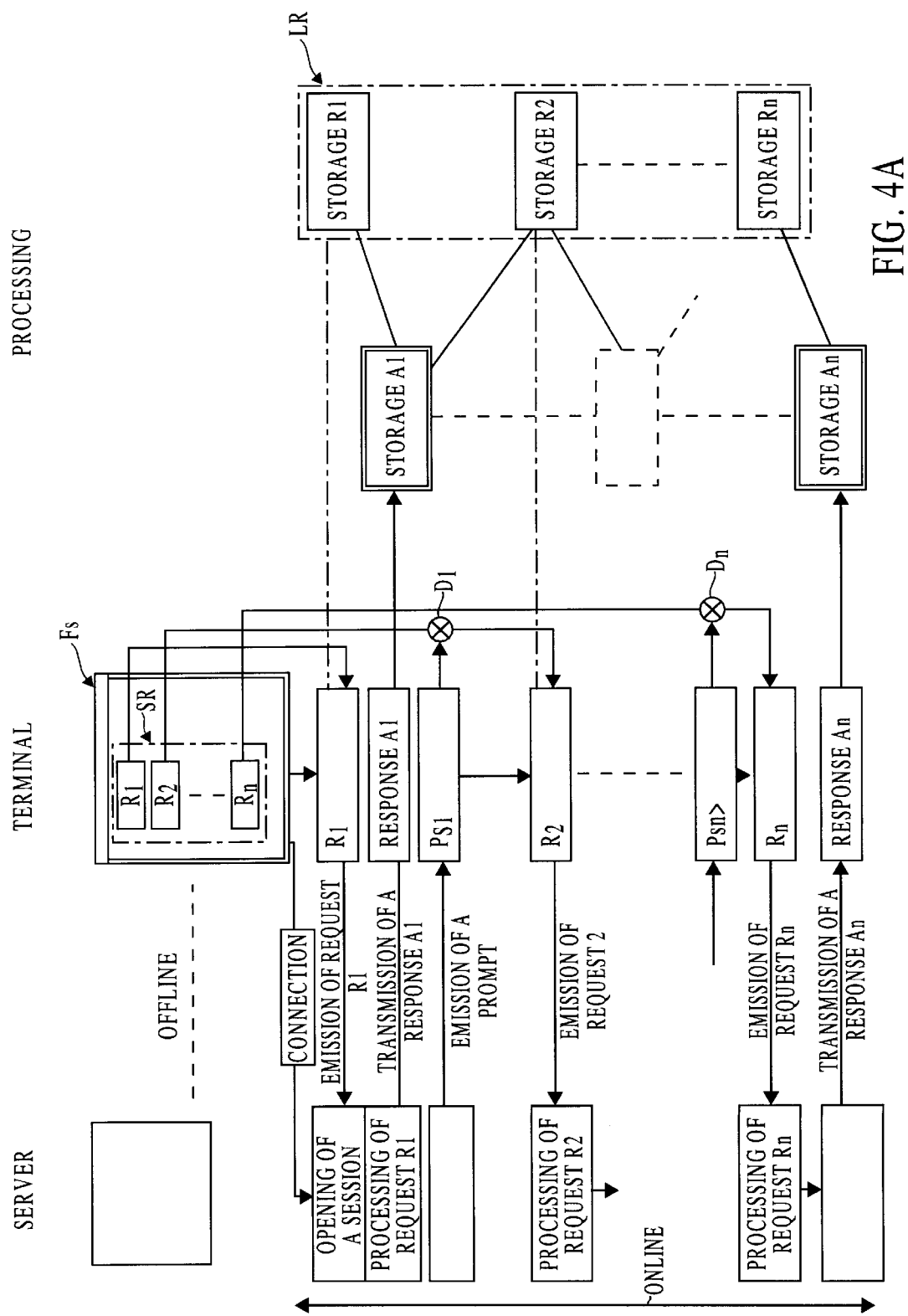
FIG. 4A is a synoptic view illustrating stages of the process according to the invention, executed in the case of deferred mode processing of the session.
Figure 4B:
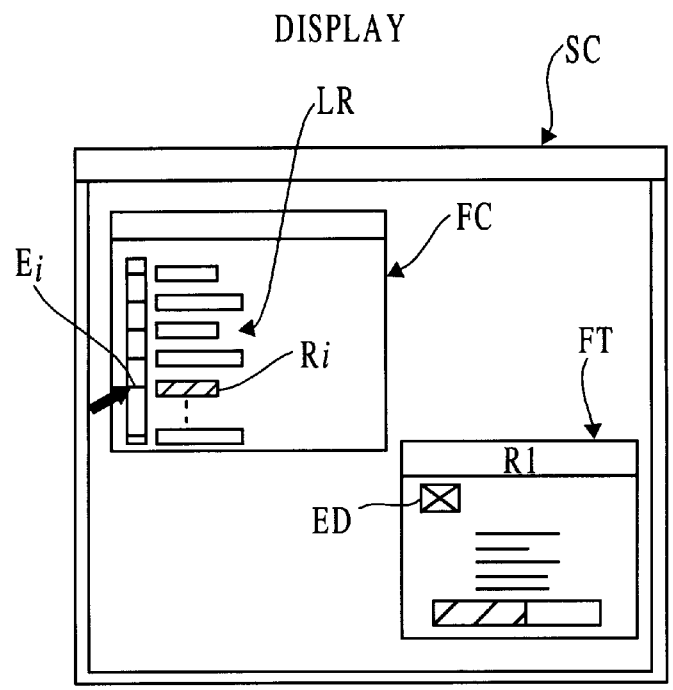
FIG. 4B shows an example of a screen comprising in particular a consultation window and a processing window for a request in progress.
Figure 4C:
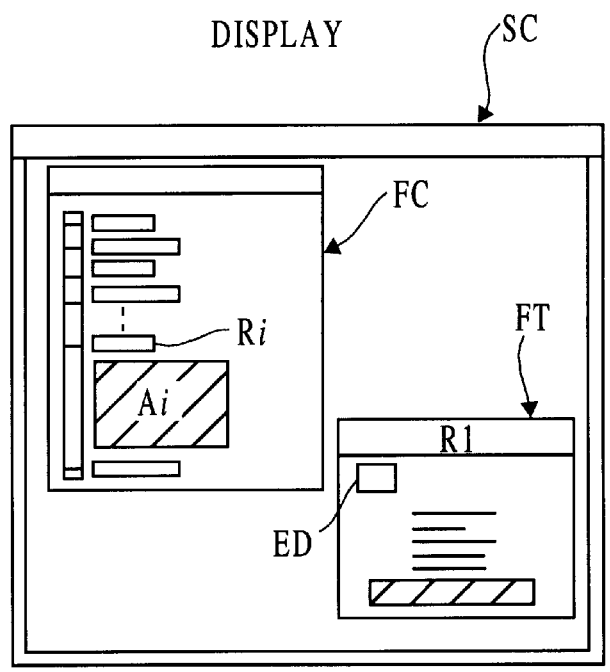
FIG. 4C shows the window in FIG. 4B, when an unfolding stage has been authorised and executed.

The consultation process according to the invention can also be implemented in a deferred request execution mode. In this mode, illustrated by FIGS. 4A to 4C, requests R1, R2, RN are entered and stored prior to any connection. They appear for example in a window Fs and constitute a list of requests (Script mode). The user then instructs the terminal to connect with a server. When the session is open, and after receipt of a prompt message, the first request R1 in the list is issued, then processed by the server which in return transmits a response A1, which is normally displayed, captured and stored. A new prompt message Ps1 is received by the terminal from the server. This prompt message is detected (D1) by the process, which then undertakes the transmission of the following request R2. This process is repeated until the initial list of requests is finished: on receipt of the last prompt message Psn, the detection (Dn) of this message thus leads to the issue of the last request Rn followed by a response An. The processing of the different transactions between the server and the terminal is materialised by the display (see FIG. 4B) on the screen SC of the terminal T of a consultation window containing a list LR of requests previously entered with which selection graphical elements are associated, and of a processing window FT illustrating the processing status for the current request R$i$. This processing window FT preferably contains a graphical availability indicator ED indicating whether a following request can be transmitted. During the online processing of each request R$i$ by the server, the user is provided with progressive display of information A$i$ in response to the said request R$i$ in the consultation window Fs as the reception by the terminal T of the characters constituting this information progresses. When transmission of the response A$i$ to the request R*i* is complete, the status of the indicator ED changes (see FIG. 4C).

The consultation process can, as a non-limitative example, be materialised by a code residing in the terminal's permanent storage means, written in an object-oriented language, for example the C++ language, and associated with a graphical interface software package available on the market, such as Windows marketed by Microsoft, or X-Window for Unix systems. Moreover, the consultation process can advantageously make use of a communications library which will in particular handle configuration of the modem, thus freeing the terminal user from this task.

It should be noted that the consultation process according to the invention can advantageously be combined with the standard features of a windows-based operating system. Thus, a FOCUS-type command can allow the display in a specific window of a response to a specific request selected from the list of requests.

Naturally, the invention is not limited to the examples which have just been described and numerous adjustments can be made to these examples without exceeding the scope of the invention. Thus, the process according to the invention can be implemented whatever the type of server or terminal, provided this terminal is at least equipped with control and processing means and with storage means. Furthermore, a wide variety of presentations can be adopted for the consultation and processing windows. Similarly, the graphical elements used to select requests can be of any type, for example simple or complex geometric shapes, symbols or characters. Response identifiers, in the case of multiple responses for the same request, can for example be numbers, alphanumerical symbols. It should also be noted that the consultation process according to the invention is not linked to a particular type of server or a particular communications mode, but is intended to be implemented on a multi-server station or platform.

We claim:

1. A process for consulting information received from at least one server, in response to requests transmitted to the server from a terminal, including, during each communication session, a stage when information exchanges between the server and the terminal are captured and stored cumulatively, these information exchanges including prompt messages emitted by the server and received by the terminal, requests, formulated by a user of said terminal in response to the receipt of a prompt message, information transmitted by the server, in response to a request:

stages for identifying and selectively storing requests issued from the terminal, stages for generating and displaying in a consultation window a list of requests selectively stored during the session, characterized in that it also includes:

stages, called unfolding stages, for selection by the user of a request from the list of requests with a view to consulting information received in response to this request, each unfolding stage being followed by a stage for displaying in the consultation window the stored information received in response to said request, such information being displayed within the list of requests following said request, and stages, called folding stages, for selection by the user of a request which has been subject to a prior unfolding stage, with a view to masking the display in the consultation window of the information corresponding to said selected request, and in that the identification and selective storage stages comprise:

stages for detecting and analyzing each prompt message originating from the server, and stages for selectively storing requests defined by the terminal user in response to each prompt message detected.

2. The process according to claim 1, characterized in that the identification and selective storage stages include stages for locally identifying each new request entered by the user.

3. The process according to claim 1, characterized in that a graphical element is associated with each request in the list of requests, and in that each folding and unfolding stage is activated by pointing to the graphical element associated with the request in question, using the selection means within the terminal.

4. The process according to claim 1, characterized in that the folding and unfolding stages can be executed online during the interrogation session, as the list of requests is permanently updated.

5. The process according to claim 1, characterized in that the folding and unfolding stages can be executed offline following an interrogation session.

6. The process according to claim 1, implemented in an interrogation session in which the information received from the server in response to a request is organized into a set of responses, characterized in that it also comprises, on receipt of said set of responses, stages for detecting identification elements for each response to said request, stages for inserting said identification elements thus identified into the list of requests following said request, and in that it also comprises unfolding sub-stages for selecting by its identification element a response from the set of responses to said request with a view to consulting the information contained in that response, this information being inserted into the consultation window following the selected identification element, and folding sub-stages for selecting by its identification element a response which has previously been subjected to an unfolding stage, with a view to masking in the consultation window the display of the information corresponding to said selected response.

7. The process according to claim 1, characterized in that the list of requests displayed in the consultation window also includes, for at least one of these requests, additional information relating to the execution of this request.

8. The process according to claim 1, applied to a session carried out by executing a series of requests previously entered and stored offline, this series of requests being displayed within the consultation window, characterized in that it also comprises, during the online processing of each request by the server, a progressive display of information issued in response to said request in the consultation window, as they are received by the terminal.

9. The process according to claim 8, also comprising stages for associating with each request currently being processed, a processing window containing information relating to the current processing, characterized in that the processing window also contains at least one availability graphical element indicating whether a following request can be issued.

10. A terminal connected via a communications network to at least one server, implementing a process for consulting information received from at least one server in response to requests transmitted to the server from a terminal, including, during each communication session, a stage when information exchanges between the server and the terminal are captured and stored cumulatively, these information exchanges including prompt messages emitted by the server and received by the terminal, requests formulated by a user of said terminal in response to the receipt of a prompt message information transmitted by the server in response to a request; stages for identifying and selectively storing requests issued from the terminal, stages for generating and displaying in a consultation window, a list of requests selectively stored during the session, characterized in that it also includes: stages, called unfolding stages, for selection by the user of a request from the list of requests with a view to consulting information received in response to this request, each unfolding stage being followed by a stage for displaying in the consultation window the stored information received in response to said request, such information being displayed within the list of requests following said request, and stages, called folding stages for selection by the user of a request which has been subject to a prior unfolding stage, with a view to masking the display in the consultation window of the information corresponding to said selected request, and in that the identification and selective storage stages comprise: stages for detecting and analyzing each prompt message originating from the server, and stages for selectively storing requests defined by the terminal user in response to each prompt message detected said terminal including control and processing means to which are associated means of communicating with the network, storage means, input means, selection means, display means and graphical interface means, the control and processing means cooperating with the communications means and the graphical interface means to generate and display in a consultation window a list of requests issued from the terminal towards the server, characterized in that the selection means cooperates with the graphical interface means, the storage means and the control and processing means in order to select a request from the list of requests and display in the consultation window information received in response to said request and previously captured and stored in the storage means.

11. The terminal according to claim 10, characterized in that the control and processing means and the graphical interface means cooperate in order to associate a graphical element with each request in the list of requests, and in that the selection means cooperate with the control and processing means, the storage means and the graphical interface means to select a request by its associated graphical element and to display the information received in response to this request.

12. The terminal according to claim 10, implemented in an interrogation session in which the information received from the server in response to a request includes a set of responses, characterized in that the control and processing means are designed to detect identification elements for each response to said request, and cooperate with the graphical interface means to insert the detected identification elements in the list of requests following said request.

13. The terminal according to claim 12, characterized in that the selection means cooperate with the control and processing means, the storage means and the graphical interface means in order to select by its identification element a response from the set of responses to said request with a view to consulting the information contained in that response, this information being inserted in the consultation window following the selected identification element.

14. The terminal according to claim 13, characterized in that the selection means cooperate with the control and processing means, the storage means and the graphical interface means in order to select by its identification element a response which has previously been subjected to an unfolding stage, with a view to masking in the consultation window the display of the information corresponding to said selected response.

15. The terminal according to claim 14, the control and processing means, the communication means and the storage means being designed to allow deferred transmission of a series of requests previously input and stored offline, characterized in that the graphical interface means, the communication means and the control and processing means cooperate in order to provide, in the course of the online processing of each request by the server, a progressive display of the information in response to said request in the consultation window, as they are received by the terminal.

16. The terminal according to claim 15, the graphical interface means cooperating with the control and processing means to supply a processing window containing information relating to the processing of a current request, characterised in that the control and processing means and the graphical interface means cooperate to provide in this processing window an availability graphical element indicating whether a following request can be issued.

17. The terminal according to claim 11, implemented in an interrogation session in which the information received from the server in response to a request includes a set of responses, characterized in that the control and processing means are designed to detect identification elements for each response to said request, and cooperate with the graphical interface means to insert the detected identification elements in the list of requests following said request.

* * * * *